July 1, 1958 — D. F. HOWARD — 2,841,713
RADIATION TYPE FLOWMETER
Filed Jan. 4, 1954 — 2 Sheets-Sheet 1
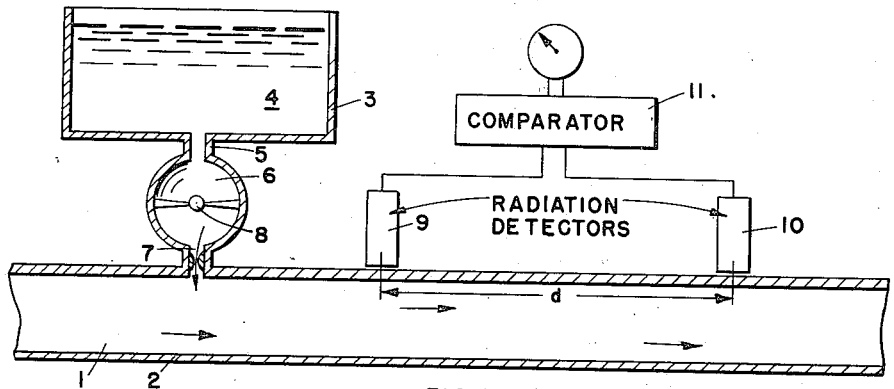
FIG. 1
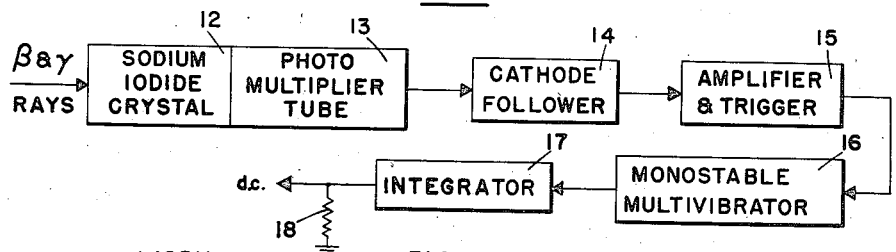
FIG. 2
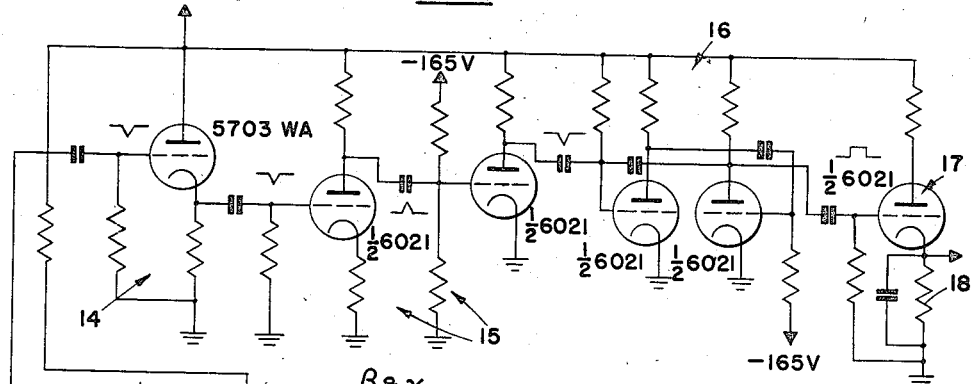
FIG. 3
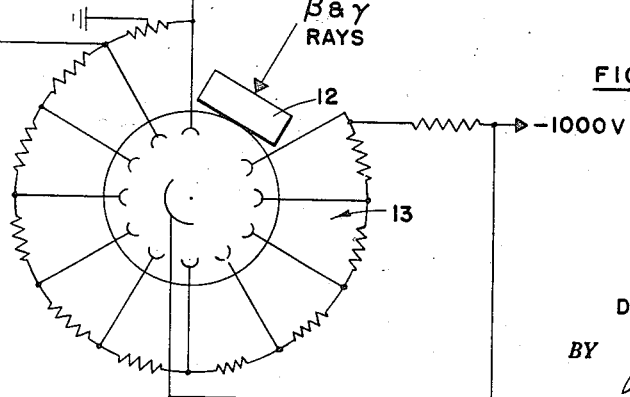
INVENTOR.
DONALD F. HOWARD
BY William R. Lane
ATTORNEY July 1, 1958

D. F. HOWARD 2,841,713

RADIATION TYPE FLOWMETER

Filed Jan. 4, 1954

INVENTOR.
DONALD F. HOWARD
BY
*William R. Lane*
ATTORNEY 2,841,713

Patented July 1, 1958

2,841,713

RADIATION TYPE FLOWMETER

Donald F. Howard, North Long Beach, Calif., assignor to North American Aviation, Inc.

Application January 4, 1954, Serial No. 401,869

12 Claims. (Cl. 250—43.5)

This invention relates to flowmeters, and particularly to a radiation type flowmeter.

Flowmeters are devices for measuring the volumetric rate of flow of a fluid stream in a conduit. In addition to mechanical metering devices, injection-detection flowmeters have been used in the past. Some of these injection-detection flowmeters inject a radioactive slug into the stream and measure the length of time required for the slug to flow a predetermined distance. Other injection-detection flowmeters utilize the constant volume injection of a radioactive tracer fluid and the subsequent detection of the dilution of the tracer fluid by the stream. This latter type of flowmeter not only requires the tracer fluid to have a predetermined and constant amount of activity per unit volume, but also requires rigid control over the volumetric rate of injection of the tracer fluid into the fluid stream. Special nozzles or constant displacement pumps are required to accomplish this latter function. It is to be noted that any variation either in the concentration of the radioactive material in the tracer fluid or in the rate of injection of the tracer fluid into the fluid stream introduces significant undetected errors into the measurement of the rate of flow.

It is a purpose of this invention to eliminate the necessity of rigidly controlling the concentration and the rate of injection of a tracer fluid into a fluid stream while continuing to obtain a continuous measurement of the volumetric rate of flow thereof.

It is therefore an object of this invention to provide an improved radiation type flowmeter.

It is another object of this invention to provide a radiation type flowmeter which injects a constant amount of radioactivity into a fluid stream by utilizing a non-radioactive tracer fluid; by subjecting said fluid to a constant magnitude particle bombardment, said fluid absorbing substantially all of said particles; and by immediately injecting said fluid into said stream; and which detects the activity of the stream below the point of injection to thereby obtain an output which is a function of the rate of flow of said stream.

It is a further object of this invention to provide an improved radiation type flowmeter which utilizes improved means for injecting into a fluid stream a predetermined number of short half-life radionuclide atoms per unit time and means for detecting the activity of said stream a predetermined distance down the stream from the point of injection to obtain thereby an output which is a function of the magnitude of the decay of said radionuclide atoms and which is further readily convertible into a measurement of the rate of flow of the fluid in said stream or of the velocity of the fluid in said stream.

It is another object of this invention to provide an improved radiation type flowmeter which utilizes means for injecting a constant number of short half-life radionuclide atoms into a fluid stream per unit time, two radiation detectors adapted to detect the absolute radioactivity of said stream at points spaced a predetermined distance apart in the direction of flow of said stream, and comparator means for comparing the radioactivity measured by said two detectors to obtain thereby an output which is a function of the time required to cause the change in radioactivity whereby the output of said comparator means is a measure of the rate of flow of said fluid stream.

Other objects of invention will become apparent from the following description taken in connection with the accompanying drawings, in which Fig. 1 is a diagram, partly schematic, of a preferred embodiment of the radiation type flowmeter contemplated by this invention;

Fig. 2 is a block diagram of a preferred type of radiation detector utilized by the flowmeter of Fig. 1;

Fig. 3 is a schematic drawing of the preferred type of radiation detector of Fig. 2;

Figure 6:
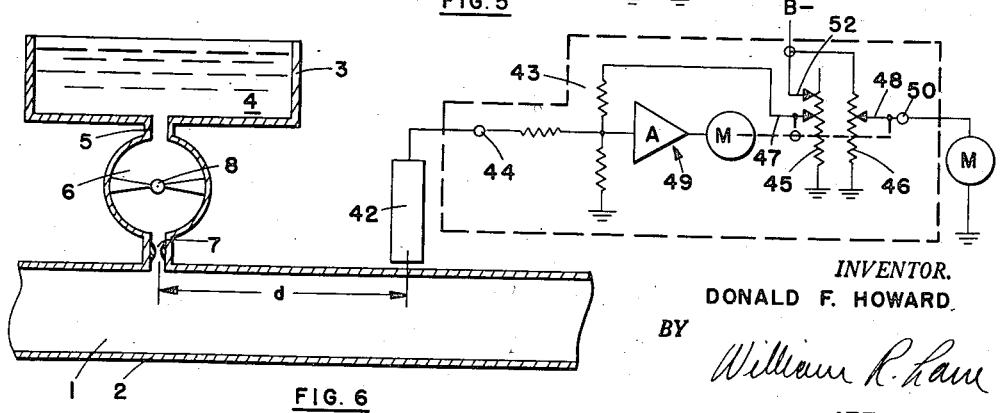

And Fig. 6 is a diagram, partly schematic, of an alternate embodiment of the radiation type flowmeter contemplated by this invention.

Before describing the operation of the radiation type flowmeter of this invention, a brief description of the nuclear reactions involved follows. The particular nuclear reaction utilized in the injection portion of the flowmeter to insure the injection of a predetermined number of radionuclide atoms into the stream is called a nuclear transmutation in which a stable nuclide is converted into a radionuclide by atomic particle bombardment. A nuclide is the term applied to a species of atom characterized by the constitution of its nucleus, that is, by the number of neutrons and the number of protons in its nucleus. Thus, a nucleus of the nuclide silver-107 ($Ag^{107}$) always contains 47 protons and 60 neutrons, whereas a nucleus of the nuclide silver-108 ($Ag^{108}$) always contains 47 protons and 61 neutrons. In this case, the difference between the two nuclides is in the number of neutrons in their respective nuclei. A nuclear transmutation is caused by the absorption by a nucleus of any one of several different types of atomic bombarding particles. Thus, the bombarding or incident particles may be neutrons, protons, alpha particles, beta particles, gamma rays or deuterons. For the purposes of illustration, but not by way of limitation, a nuclear transmutation produced by "thermal neutron" bombardment is assumed.

When a nucleus is bombarded with neutrons, the resulting nuclear transmutation is generally of the nature $(n, \gamma)$, $(n, p)$, $n, \alpha)$, $(n, d)$, or $(n, 2n)$. In this method of notation of transmutation the first item within the parenthesis is the type of incident particle captured by the nucleus, while the second item in the parenthesis indicates the type of radiation which accompanies the capture of the incident neutron. The most common transmutation, when thermal neutrons are used as incident particles, is the $(n, \gamma)$ reaction. In the $(n, \gamma)$ reaction the nucleus captures a neutron, thereby increasing its atomic weight by one, without changing its atomic number. At the same time, gamma rays, $\gamma$, are emitted from the nucleus. A typical $(n, \gamma)$ reaction equation is

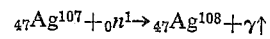

which for convenience may be rewritten

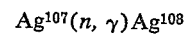

Nuclides may be classified either as stable nuclides or as radionuclides. A radionuclide is an unstable nuclide which is characterized by a tendency to disintegrate spontaneously by the emission of radiations ultimately decaying into a stable nuclide. A stable nuclide is a nuclide which does not spontaneously disintegrate. The elements in their natural states are usually composed of a mixture of two or more stable nuclides in a predeterminable ratio. It may be noted, however, that some elements in nature do consist of only one stable nuclide. Thus, for example, 51.4% of the atoms in most natural silver masses are $Ag^{107}$, while the other 48.6% are $Ag^{109}$. This means that 51.4% of the silver atoms in any given amount have an atomic weight of 107, while the other 48.6% have an atomic weight of 109. When this natural silver is subjected to thermal neutron bombardment some of the nuclei of each nuclide capture a neutron in accordance with the following reaction equations: $Ag^{107}(n, \gamma)Ag^{108}$, and $Ag^{109}(n, \gamma)Ag^{110}$. The numerical ratio of formation is disclosed below.

In the above example the newly formed nuclides $Ag^{108}$ and $Ag^{110}$ are both radionuclides. They disintegrate spontaneously by emitting beta particles and gamma rays. This disintegration is not instantaneous but is a progressive decay from a radionuclide to a stable nuclide. Thus, each atom of $Ag^{108}$ emits a beta particle and a gamma ray, and becomes an atom of stable nuclide $Cd^{108}$. Similarly, $Ag^{110}$ decays into stable nuclide $Cd^{110}$. The rate of radioactive decay of a mass of a particular radionuclide follows strictly the first order law. The rate constant, $\lambda$, or the half-life, $T_{1/2}$, is a definite characteristic of each radionuclide. This decay as well as the radiations from a given mass caused by the decay of the particular radionuclide atoms decreases exponentially with time. The half-life, $T_{1/2}$, is a measure of the length of time required for one-half of the original number of nuclei to decay. The half-lives of known radionuclides range from $2 \times 10^{-8}$ seconds to $10^{10}$ years. Thus, $Ag^{110}$ has a half-life of approximately twenty-four seconds, while $Ag^{108}$ has a half-life of 2.3 minutes. As will be explained later, the radiations from the $Ag^{108}$ radionuclide formed by the apparatus of this invention may be neglected, provided the exposure time of the natural silver to the neutron flux is short and all subsequent measurements of radioactivity of the mass of silver are made within a comparatively short period of time.

In order to produce the radionuclides by neutron bombardment it is necessary that a nuclear transmutation occur, i. e., that a neutron be captured by a nucleus of the stable nuclide. The probability of the occurrence of a nuclear transmutation when a particular nuclide is bombarded by neutrons is a function of the nuclide's cross-section. The microscopic cross-section, $\sigma$, of a nuclide is the probability of occurrence of a nuclear reaction per atom per incident particle per square centimeter. The microscopic absorption cross-section, $\sigma_a$, is the sum of all the cross-sections for all nuclear reactions with the atom in which a nuclear transmutation occurs. The unit of measurement of cross-sections is the barn, which is equal to $10^{-24}cm.^2$. The macroscopic cross-section, $\Sigma$, is the product of microscopic cross-section and the number of atoms per unit volume. Therefore, $\Sigma$, is the cross-section per unit volume. Of particular interest in the selection of a suitable tracer fluid of the flowmeter contemplated by this invention is the macroscopic absorption cross-section, $\Sigma_a$, of the stable nuclides in the tracer solution. It is desirable that the $\Sigma_a$ of at least one of the nuclides in this tracer fluid be high, that is, that there by a high probability of capture of the incident particles by this nuclide. Correspondingly, it is desirable that all the other nuclides in the fluid have a relatively poor $\Sigma_a$.

Referring now to Fig. 1, a preferred embodiment of the radiation type flowmeter contemplated by this invention is shown. The volumetric rate of flow, Q, of fluid stream 1 in main conduit 2 is desired. Since the physical dimensions of main conduit 2 are known and it is assumed that stream 1 completely fills main conduit 2 at all times, the rate of flow, Q, is readily obtainable if the increment of time, $\Delta t$, required for a portion of stream 1 to travel a predetermined distance, $d$, in the conduit is known. Thus, the volumetric rate of flow $$Q = A \frac{d}{\Delta t}$$

where A is a constant determined by the physical dimensions of conduit 2. The apparatus of Fig. 1 is uniquely adapted to continuously produce an output which is a function of the increment of time, $\Delta t$. By a simple linear conversion, this output is calibrated to read the volumetric rate of flow, Q, or to read the velocity of flow, $$V = \frac{d}{\Delta t}$$

The apparatus of Fig. 1 may, for convenience of description, be divided into two parts. The first portion comprises a means for injecting a constant number of radionuclide atoms per unit time into fluid stream 1. The second portion comprises a means for detecting the time increment, $\Delta t$, required for these radioactive atoms to travel a predetermined distance, $d$, in stream 1. The injection portion utilizes reservoir 3 filled with a nonradioactive tracer fluid 4. Tracer fluid 4 contains at least one stable nuclide with a good absorption cross-section for thermal neutrons. In the preferred embodiment of Fig. 1, an aqueous solution of silver nitrate is used as a tracer fluid. Tracer fluid 4 is injected into fluid stream 1 through tube 5, radiation chamber 6, and tube 7. Supported inside radiation chamber 6 is source 8 of thermal neutrons. Source 8 is preferably a polonium-beryllium neutron source encased in paraffin which, because of the long-life of the polonium nuclide, produces thermal neutrons at a substantially constant rate. The layer of fluid 4 surrounding source 8 is maintained sufficiently thick to insure the capture of substantially all of the neutrons produced by source 8.

Preferably, fluid 4 has only one nuclide with a good absorption cross-section for thermal neutrons. In that event, all of the neutrons are absorbed by that nuclide, and a predetermined number of radionuclide atoms equal to the number of thermal neutrons from source 8 are formed per unit time. Since the rate of generation of thermal neutrons is constant, the rate of formation of the radionuclide atoms is also constant despite any changes in the rate of flow of fluid 4 through radiation chamber 6. These radionuclide atoms are continuously injected into stream 1 through tube 7. The radionuclide atoms, while flowing with stream 1, continuously decay. As previously pointed out, this decay is along an exponential curve.

Tracer fluid 4 may, however, contain two or more nuclides each having a good absorption cross-section. Further, the radionuclides produced may have different decay rates. In this event, compensation may have to be made in the detection circuitry since the decay curve of the mixture of the two or more radionuclides is no longer a true exponential but is distorted. The exact decay curve of a mass of two or more radionuclides having different decay rates can be determined either experimentally or theoretically. For example, a sample of tracer fluid 4 is subjected to the radiations from source 8 in the normal manner. Instead of injecting this sample into fluid stream 1, the radiations from a unit volume of the sample are detected and a plot is made of radiation counts vs. time. This plot indicates the decay curve for that particular combination of nuclides. This curve is actually composed of the sum of a series of exponential curves, each having a different magnitude at time, $t_0$, and a different decay constant, $\lambda$. To obtain the decay curve theoretically the component exponential curves are found and added together to obtain an accurate plot of radioactivity versus time. For example, the rates of formation of the radionuclides $Ag^{108}$ and $Ag^{110}$ from neutron bombardment of natural silver vary directly with the percentage composition of the silver and with the thermal neutron absorption cross-sections of nuclides $Ag^{107}$ and $Ag^{109}$. The percentage composition is 51.4% and 48.6%, while the cross-sections are 30 and 82 barns, respectively. Further, the activity, $\lambda N$, at time, T, is proportional to $(1-e^{-\lambda T})$ where $\lambda$ is the decay constant of the product radionuclide, N is the number of atoms of the radionuclide, and T is the time of exposure of the nuclide to the neutron flux. Thus, the ratio $$\frac{\lambda N_{110}}{\lambda N_{108}}$$

of the activity of radio nuclide $Ag^{110}$ to the activity of radionuclide $Ag^{108}$ is as follows:

$$\frac{\lambda_{110} N_{110}}{\lambda_{108} N_{108}} = \frac{(.486)}{(.514)} \times \frac{(82)}{(30)} \times \frac{(1-e^{-.03T})}{(1-e^{-.005T})}$$

If T is of the nature of two seconds or less, the activity ratio is 16 or more to 1, which means that the activity from radionuclide $Ag^{110}$ in radiation chamber 6 is 16 times as intense as the activity from radionuclide $Ag^{108}$. Thus, initially, the radionuclide $Ag^{110}$ dominates the decay curve to the practical exclusion of radionuclide $Ag^{108}$. It is well to note here that while radionuclide $Ag^{110}$ is dominant initially, it also has a much shorter half-life than radionuclide $Ag^{108}$. Therefore, the influence of $Ag^{108}$ on the decay curve increases until eventually only $Ag^{108}$ atoms are disintegrating. As long as all readings of radioactivity are made within approximately 24 seconds, the radiations from the $Ag^{108}$ radionuclide can be safely ignored without materially affecting the output.

From the foregoing it is apparent that as long as the silver nitrate in tracer fluid 4 is not subjected to prolonged thermal neutron bombardment from source 8, that is, less than two seconds exposure; and as long as the detector units obtain their readings of the radioactivity within a short time after the radionuclides are formed, that is, preferably within the half-life of $Ag^{110}$ or 24 seconds, a decay curve of the mass of radionuclides formed by the neutron bombardment of natural silver is substantially equivalent to an exponential decay curve. If the aforementioned values are exceeded, the decay of the $Ag^{108}$ radionuclide begins to affect the reading of the rate of flow of stream 1. This effect may be compensated for by appropriate distortion of the winding of a non-linear potentiometer, as will be explained later.

Referring now to the detector portion of Fig. 1, an output proportional to the time, $\Delta t$, required for fluid stream 1 to flow a predetermined distance, d, is desired. This time is obtained by measuring and interpreting the change in radioactivity of stream 1 as it flows between two points a distance, d, apart. Radiation detectors 9 and 10 are positioned to detect the absolute radioactivity of the stream at points immediately adjacent to their sensitive elements. Detectors 9 and 10 preferably have a D.-C. voltage output proportional to this radioactivity. These D.-C. voltage outputs are coupled into comparator 11 where they are converted and compared and an output voltage obtained which is a function of time, $\Delta t$.

A typical radiation detector circuit capable of converting the number of radiations entering the sensitive element into a D.-C. voltage is shown in Figs. 2 and 3. The beta particles and gamma rays from stream 1 enter sodium iodide crystal 12. Each radiation causes crystal 12 to scintillate, that is, to produce a small flash of visible light. The number of flashes of light in crystal 12 per unit time is a measure of the radioactivity of the stream. The rest of the detector circuit effectively counts the number of flashes of light and converts this information into a D.-C. potential. Photomultiplier tube 13 converts the flash of light into an electric pulse and amplifies this pulse many times. Cathode follower 14 isolates photomultiplier tube 13 from the rest of the circuit. Amplifier and trigger stage 15 increases the magnitude of the pulse and triggers monostable multivibrator 16 in response to the pulse. Multivibrator 16 produces a constant-amplitude, constant-width square-wave output pulse for each input pulse. The number of square-wave pulses per unit time, therefore, is determined by the frequency of the radiations entering crystal 12. Integrator 17 averages the output of multivibrator 16 and produces a D.-C. voltage across resistor 18 which is proportional to the radioactivity of the stream at a point adjacent to crystal 12.

Figure 4:
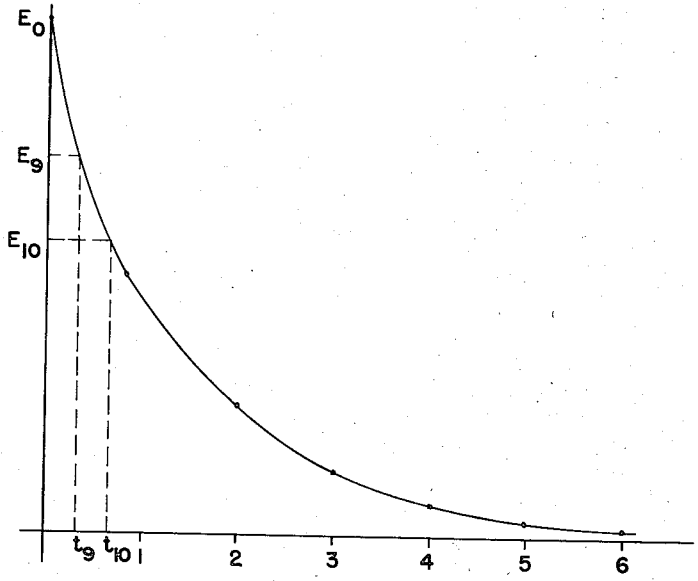
Fig. 4 is graphic presentation of a typical radioactive decay curve of a radionuclide.

Referring now to Fig. 4, a typical decay curve of a radionuclide is shown. This curve is a true exponential. The radioactivity of the radio-nuclide, indicated in Fig. 4 as the ordinate in terms of a voltage proportional to radioactivity, is plotted against time. If two or more radio-nuclides are mixed in a given mass, the decay curve is similar in shape but somewhat distorted. Since the exposure time of the silver nitrate solution of Fig. 1 is very short and since detectors 9 and 10 read the radioactivity of stream 1 within a very short time after formation of the radionuclides, the radiations from the $Ag^{108}$ radionuclide are neglected. Thus, the curve of Fig. 4 is indicative of the decay of tracer fluid 4. Voltage $E_9$ in Fig. 4 is the voltage which appears across resistor 18 of detector 9 and is directly proportional to the radioactivity of stream 1 at a point adjacent to detector 9. Similarly, voltage $E_{10}$ in Fig. 4 is the voltage which appears across resistor 18 of detector 10 and is directly proportional to the radioactivity of stream 1 at a point adjacent to detector 10. It is the purpose of comparator 11 of Fig. 1 to translate voltages $E_9$ and $E_{10}$ into voltages which are functions of times $t_9$ and $t_{10}$, respectively, and to subtract these voltages to obtain thereby an output voltage which is a function of time $\Delta t$.

Figure 5:
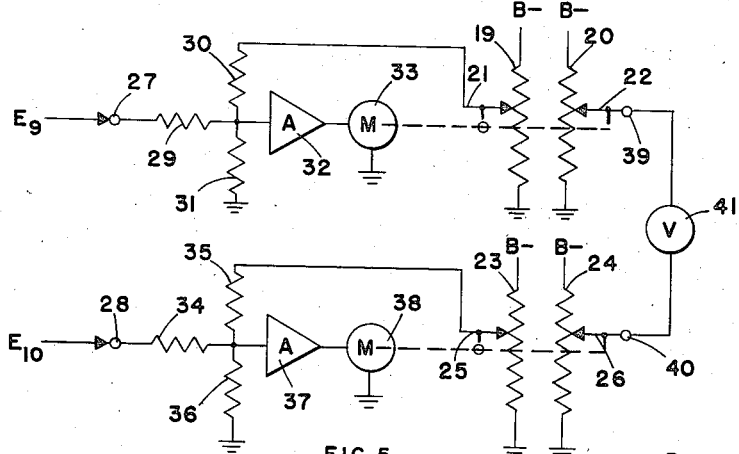
Fig. 5 is a schematic drawing of a preferred comparator circuit utilized in the flowmeter of Fig. 1.

Referring now to Fig. 5, a schematic drawing of a circuit which converts detector voltages $E_9$ and $E_{10}$ into corresponding time voltages is shown. This circuit utilizes non-linear potentiometers 20 and 24, linear potentiometers 19 and 23, and ganged wipers 21, 22, and 25, 26. Potentiometers 19, 20, 23, and 24 are connected to a source (not shown) of constant D.-C. potential. Voltage $E_9$ from detector 9 is coupled into comparator 11 at terminal 27. Voltage $E_{10}$ from detector 10 is coupled into comparator 11 at terminal 28. The voltage at wiper 21 is maintained equal and opposite to the voltage at terminal 27 by a closed servo loop consisting of resistors 29, 30, and 31, amplifier 32 and motor 33. As long as the signal from wiper 21 through resistor 30 balances the signal from detector 9 through resistor 29 there is no signal input to motor 33. If the radio-activity of stream 1 at a point opposite detector 9 changes, there is a corresponding change in voltage $E_9$, unbalancing the input to the servo loop. Amplifier 32 detects this unbalanced condition and energizes motor 33 to drive wipers 21 and 22 to a new position corresponding to the new input. By winding potentiometer 20 as a function of the exponential decay of the radionuclide, the voltage $E_9$ is effectively converted into a time voltage output on wiper 22. Similarly, the voltage at wiper 25 is maintained equal and opposite to voltage $E_{10}$ at terminal 28 by a closed servo loop consisting of resistors 34, 35 and 36, amplifier 37, and motor 38. By winding potentiometer 24 as a function of the exponential decay of the radionuclide; the voltage $E_{10}$ is effectively converted into a time voltage output on wiper 26. Measurement of the difference between the time voltage outputs is made by measuring the potential between terminals 39 and 40. This measurement is made by voltmeter 41 which is graduated to read either in terms of volume of fluid per unit time, or in terms of velocity.

Referring now to Fig. 6, an alternative embodiment of the radiation type flowmeter contemplated by this invention is shown. The injection portion of this flowmeter is the same as that previously described with respect to Fig. 1. The detection portion consists of radiation detector 42 which is the same as detectors 9 and 10. The output voltage of detector 42 is coupled into converter stage 43. The sensitive crystal of detector 42 is spaced a predetermined distance, $d$, from the point of injection of tracer fluid 4 into stream 1. Detector 42 is adapted to detect the radiations from stream 1 and produce a D.-C. voltage directly proportional to the number of radiations per unit time. This voltage is coupled into converter 43 through terminal 44. Converter 43 consists of non-linear potentiometer 46, linear potentiometer 45, ganged wipers 47 and 48, and closed servo loop 49. A source (not shown) of constant D.-C. potential is applied to potentiometers 45 and 46. Wiper 52 on potentiometer 45 is provided to calibrate the instrument in accordance with the strength of source 8. This effectively shifts the voltage magnitude at time $t_0$ in Fig. 4. The potential on wiper 47 is maintained equal and opposite to the potential at terminal 44 by means of closed servo loop 49. The output voltage $V_t$ at terminal 50 is therefore a predetermined function of the length of time required for the radionuclide to flow from the radiation chamber 6 to detector 42. By appropriately calibrating voltmeter 51, a direct reading of volumetric rate of flow or velocity of flow is obtained.

In the event a second radionuclide is formed in radiation chamber 6 in sufficient magnitude to affect the accuracy of the output, potentiometers 20 and 24 of Fig. 5 and potentiometer 46 of Fig. 6 are wound according to the distorted exponential previously described. This distorted exponential is in reality the sum of two or more exponential decay curves having different magnitudes at times $t_0$ and different decay constants, $\lambda$.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A radiation-type flowmeter adapted to continuously indicate the rate of flow of a fluid stream comprising means for injecting a radionuclide into said fluid stream, said radionuclide being characterized by having a detectable decay in radiations during the time required for said fluid stream to flow a predetermined distance; and means for determining the decay of said radionuclide while flowing said predetermined distance in said fluid stream whereby the output of said decay determining means is a predetermined function of said rate of flow.

2. A flowmeter as recited in claim 1 in which said decay determining means comprises a pair of radiation detectors positioned to detect the radioactivity of said fluid stream at two points a predetermined distance apart, and means for comparing the outputs of said radiation detectors to obtain thereby an output which is a function of the radioactive decay of said radionuclide as it flows in said stream between said two points.

3. A radiation-type flowmeter for measuring the rate of flow of a fluid stream comprising conduit means for conveying said fluid stream; a radiation chamber; a source of atomic bombardment particles within said radiation chamber, said source generating a substantially constant number of particles per unit time; a tracer fluid having at least one nuclide with a good absorption cross-section for the atomic particles from said source, the radionuclide generated by the absorption of said atomic particle by said nuclide being characterized by having a detectable decay in radiations during the time required for said fluid stream to flow a predetermined distance; means for conveying said tracer fluid through said radiation chamber and into said fluid stream; and means for determining the decay of said radionuclide while flowing said predetermined distance in said fluid stream whereby the output of said decay determining means is a predetermined function of said rate of flow.

4. A radiation-type flowmeter for measuring the rate of flow of a fluid stream comprising conduit means for conveying said fluid stream; a radiation chamber; a source of atomic bombarding particles positioned within said radiation chamber, said source producing a predetermined number of particles per unit time; a tracer fluid having a stable nuclide with a good absorption cross-section for the atomic particles from said source, said stable nuclide forming a short half-life radionuclide upon absorbing said particles, said radionuclide being characterized by having a detectable decay in radiations during the time required for said fluid stream to flow a predetermined distance; means for conveying said tracer fluid through said radiation chamber and into said fluid stream; and means for determining the decay of said radionuclide while flowing said predetermined distance, comprising a pair of radiation detectors positioned to detect the radioactivity of said fluid stream at two points said predetermined distance apart, and means for comparing the outputs of said radiation detectors to obtain thereby an output which is a function of the radioactive decay of said radionuclide as it flows in said stream between said two points.

5. A radiation-type flowmeter for measuring the volumetric rate of flow of a fluid stream comprising conduit means for conveying said fluid stream; a radiation chamber; a source of atomic bombarding particles positioned within said radiation chamber, said source producing a predetermined number of particles per unit time; a tracer fluid having a stable nuclide with a good absorption cross-section for the atomic particles of said source, said nuclide upon capture of said particle producing a radionuclide with a short half-life, said radionuclide being characterized by having a detectable decay in radiations during the time required for said fluid stream to flow a predetermined distance; means for conveying said tracer fluid through said radiation chamber and into said fluid stream; a first radiation detector positioned in close proximity to said conduit means; a second radiation detector positioned in close proximity to said conduit means and spaced said predetermined distance from said first detector in the direction of flow of said fluid stream, both of said detectors being downstream from the point of injection of said tracer fluid, each of said detectors having an output which is a function of the radioactivity of said fluid stream; and means for comparing the outputs of said radiation detectors to thereby determine the radioactive decay of said radionuclide as it flows between said two radiation detectors whereby the output of said comparing means is a predetermined function of the volumetric rate of flow of said fluid stream.

6. A flowmeter as recited in claim 5 in which said source of atomic particles is a source of thermal neutrons of predetermined density and in which said tracer fluid contains at least one nuclide with a good thermal neutron absorption cross-section.

7. A radiation-type flowmeter for measuring the volumetric rate of flow of a fluid stream comprising conduit means for conveying said fluid stream, a radiation chamber, a polonium-beryllium source of thermal neutrons within said radiation chamber, an aqueous solution of silver nitrate, means for conveying said solution through said radiation chamber and into said fluid stream, a radiation detector positioned to measure the radioactivity of said fluid stream at a point downstream from the point of injection of said solution, a second radiation detector positioned to measure the radioactivity of said fluid stream a predetermined distance in a direction of flow of said fluid stream from said first radiation detector, and means for comparing the outputs of said radiation detectors to produce thereby an output which is a predetermined function of the decay in radioactivity of said fluid stream between said radiation detectors whereby said output of said comparison means is a predetermined function of the volumetric rate of flow of said fluid stream.

8. A radiation-type flowmeter for measuring the rate of flow of a fluid stream comprising means for injecting a predetermined number of atoms of a short half-life radionuclide into said fluid stream per unit time, said radionuclide being characterized by having a detectable decay in radiations during the time required for said fluid stream to flow a predetermined distance, a radiation detector positioned in close proximity to said fluid stream at a point downstream from said injecting means and having an output proportional to the radioactivity of said stream, a second radiation detector positioned in close proximity to said fluid stream at a point downstream from said injecting means and having an output proportional to the radioactivity of said stream, and means for comparing the output of said first radiation detector to the output of said second radiation detector to obtain an output signal which is a function of the time interval required for said radionuclide to decay an amount proportional to the relative change in radioactivity of said fluid stream as measured by said first and second radiation detectors whereby the output of said comparing means is a predetermined function of the rate of flow of said fluid stream.

9. A radiation-type flowmeter for continuously measuring the rate of flow of a fluid stream comprising injection means adapted to continuously inject a predetermined number of nuclei of a radionuclide having a short half-life into said fluid stream per unit time, said injection means including a radiation chamber, a long half-life source of atomic radiations positioned in said radiation chamber, a reservoir, a tracer fluid in said reservoir, said tracer fluid containing a nuclide characterized by a good absorption cross-section for said atomic radiations from said source, a short half-life radionuclide being formed by said nuclide absorbing said atomic radiations, said radionuclide being characterized by having a detectable decay during the time required for said fluid stream to flow a predetermined distance, means for conveying said tracer fluid from said reservoir to said radiation chamber, and means for conveying said tracer fluid from said radiation chamber to said fluid stream, the volume of said tracer fluid in said radiation chamber being sufficient to insure absorption by said nuclide of substantially all of said radiations from said source, and detecting means adapted to produce an output signal which is a function of the length of time required for said fluid stream to travel the predetermined distance, said detecting means including radiation detectors spaced a predetermined distance apart in the direction of flow of said fluid stream and adapted to produce an output which is directly proportional to the instantaneous radioactivity of said stream at points immediately adjacent to said detectors, means for converting the outputs of said detectors into output signals which are a function of the length of time required for said radionuclei to decay from a predetermined magnitude of radioactivity to the activity detected by said detectors, and means for comparing the output signals from said converting means to produce an output which is equivalent to the difference between said signals whereby said output signal from said detecting means is a predetermined function of the rate of flow of said fluid stream.

10. A radiation-type flowmeter adapted to continuously detect the rate of flow of a fluid stream comprising means for continuously injecting a solution containing a radionuclide into said fluid stream, said radionuclide having a short half-life compared to the time required for said fluid stream to flow between two predetermined points; and means for measuring the radioactive decay of said radionuclide while flowing between said two points in said fluid stream whereby the output of said decay measuring means is a predetermined function of said rate of flow.

11. A radiation-type flowmeter adapted to continuously detect the rate of flow of a fluid stream comprising a tracer fluid having a stable nuclide characterized by being easily converted into a short half-life radionuclide, said radionuclide being characterized by having a detectable variation in the degree of decay of radiations over the approximate period of time required for said fluid stream to flow a predetermined distance; means for continuously injecting said tracer fluid into said fluid stream; means for artificially converting at a predetermined rate said stable nuclide of said tracer fluid into said short half-life radionuclide at a point just prior to injection into said fluid stream; and means for detecting the radioactive decay of said radionuclide in said tracer fluid while flowing said predetermined distance in said fluid stream whereby the output of said decay determining means is a predetermining function of said rate of flow.

12. A radiation-type flowmeter as recited in claim 11 in which said means for detecting the radioactive decay of said radionuclide in said tracer fluid comprises means responsive to the reactivity of said tracer fluid at two points spaced said predetermined distance apart in the direction of flow of said fluid stream and means responsive to said reactivity responsive means for producing an output which is a function of the difference between said reactivities at said two points whereby the output of said difference measuring means is a predetermined function of said rate of flow of said fluid stream.

References Cited in the file of this patent

UNITED STATES PATENTS

| | | |
|---|---|---|
| 2,453,456 | Piety | Nov. 9, 1948 |
| 2,599,975 | Carpenter | June 10, 1952 |
| 2,617,941 | Craggs | Nov. 11, 1952 |
| 2,631,242 | Metcalf | Mar. 10, 1953 |
| 2,640,936 | Pajes | June 2, 1953 |